United States Patent
Zavitz (10) Patent No.: US 9,175,493 B2
(45) Date of Patent: Nov. 3, 2015

(54) CORE COMPONENT AND TOWER ASSEMBLY FOR A TOWER STRUCTURE

(71) Applicant: Tindall Corporation, Spartanburg, SC (US)

(72) Inventor: Bryant Allan Zavitz, Dunwoody, GA (US)

(73) Assignee: Tindall Corporation, Spartanburg, SC (US)

( * ) Notice: Subject to any disclaimer, the term of this patent is extended or adjusted under 35 U.S.C. 154(b) by 0 days.

(21) Appl. No.: 14/228,748

(22) Filed: Mar. 28, 2014

(65) Prior Publication Data

US 2014/0290161 A1 Oct. 2, 2014

Related U.S. Application Data (60) Provisional application No. 61/806,541, filed on Mar. 29, 2013.

(51) Int. Cl.
| | |
|---|---|
| *E04H 12/00* | (2006.01) |
| *E04H 12/20* | (2006.01) |
| *E04C 5/08* | (2006.01) |
| *E02D 27/00* | (2006.01) |
| *E04H 12/16* | (2006.01) |
| *E04H 12/12* | (2006.01) |
| *E04H 12/18* | (2006.01) |
| *E04H 12/34* | (2006.01) |

(52) U.S. Cl.
CPC ............... *E04H 12/16* (2013.01); *E04H 12/12* (2013.01); *E04H 12/185* (2013.01); *E04H 12/342* (2013.01); *Y02E 10/726* (2013.01)

(58) Field of Classification Search
CPC ... Y02E 10/728; Y02E 10/726; Y02E 10/727; E02D 27/42; E02D 27/425; E02D 5/80; E04H 12/00
USPC ............... 52/40, 152, 297, 745.17, 292, 296, 52/651.01, 223.14
See application file for complete search history.

(56) References Cited

U.S. PATENT DOCUMENTS

| | | | | |
|---|---|---|---|---|
| 1,194,305 | A * | 8/1916 | McMillan | 52/245 |
| 1,400,251 | A * | 12/1921 | Van Cott | 52/152 |
| 8,607,517 | B2 * | 12/2013 | Jolly | 52/292 |
| 2007/0181767 | A1 * | 8/2007 | Wobben | 248/346.01 |
| 2007/0251187 | A1 * | 11/2007 | Schiffer et al. | 52/741.14 |
| 2008/0302038 | A1 * | 12/2008 | Wobben | 52/296 |
| 2009/0000227 | A1 * | 1/2009 | Jakubowski et al. | 52/223.4 |
| 2009/0307998 | A1 * | 12/2009 | Zavitz et al. | 52/152 |
| 2011/0061321 | A1 * | 3/2011 | Phuly | 52/297 |
| 2012/0047830 | A1 * | 3/2012 | Phuly | 52/294 |
| 2012/0137622 | A1 * | 6/2012 | Patterson et al. | 52/651.01 |

* cited by examiner

*Primary Examiner* — Phi A
*Assistant Examiner* — Omar Hijaz
(74) *Attorney, Agent, or Firm* — Montgomery Fazzone PLLC (57) ABSTRACT

A core component for a base of a tower assembly includes a body of the core component and a flange. The body has an arcuate outer sidewall and an arcuate inner sidewall. The body includes a hole extending from the outer sidewall to a bottom of the body. The flange extends from the arcuate inner sidewall of the body. The flange includes at least one bore hole configured to receive a post-tensioning tendon.

14 Claims, 8 Drawing Sheets

CORE COMPONENT AND TOWER ASSEMBLY FOR A TOWER STRUCTURE

CROSS REFERENCE TO RELATED APPLICATIONS

This application claims priority under 35 U.S.C. §119(e) to U.S. Application No. 61/806,541, filed Mar. 29, 2013, the entire content of which is incorporated into the present application by reference.

FIELD OF THE SUBJECT MATTER

The presently disclosed subject matter relates generally to tower structures, and more specifically to methods and corresponding and/or related apparatus for assembling tower structures. In particular, the presently disclosed subject matter relates to methods and apparatus for assembling tower base structures.

BACKGROUND OF THE INVENTION

Construction of towers for support of various items has been practiced for many years. Various towers of various materials, including wooden, steel, and, more recently, concrete, have been provided to support, for example, electrical transmission lines. In like manner, wind driven apparatus including windmills and wind-driven power generators in various forms and designed for many purposes (including for example pumping of water from wells as well as, more recently, generation of electrical power) have also been developed.

Various systems and methods are known in the tower construction and support arts for erecting tower structures. For example, U.S. Pat. No. 3,945,107 to Houck discloses a process for erecting a vertical rising mast. U.S. Pat. No. 6,614,125 to Willis et al. discloses a method and means for mounting a wind turbine on a tower. U.S. Pat. No. 7,877,934 to Livingston et al. discloses a lifting system and apparatus for constructing wind turbine towers. U.S. Pat. Appl. Pub. No. 2010/0281819 to Thompson discloses a slip formed concrete wind turbine tower. U.S. Pat. No. 2,036,771 to Pfistershammer discloses a tubular pole. U.S. Pat. No. 4,388,787 to Milbright discloses a pole construction having a lower steel section and an upper wooden section. U.S. Pat. No. 6,705,058 to Foust et al. discloses a multiple-part pole. U.S. Patent Application Publication No. 2007/0006541 to Seidel discloses a tower foundation. Further examples of erection methods and apparatus are disclosed in Zavitz et al. (U.S. Pat. App. Pub. No. 2009/0307998), Zavitz et al. (U.S. Pat. App. Pub. No. 2009/0308006), and Knox et al. (U.S. Pat. App. Pub. No. 2009/0308019).

The subject matter of each of the herein-referenced published patent-related documents is fully incorporated herein by reference, and for all purposes.

Some known tower structures are relatively expensive and time consuming to erect. For example, the cost of the materials for molding certain tower structure designs formed from concrete may be relatively significant. Further, because such known concrete tower structures generally require significant time and labor to erect, certain systems and methods for erecting the tower structures similarly may be relatively slow and often cumbersome.

Additionally, as the size and weight of tower structure designs continue to increase, suitable structural reinforcement of such tower structures is required. It may thus be generally desirable that reinforcement members are included in various structural components that are capable of additionally reinforcing neighboring structural components.

Accordingly, improved methods and apparatus for assembling tower structures are desired in the art. In particular, methods and apparatus that facilitate efficient and structurally sound tower base structure assemblies would be advantageous.

SUMMARY OF THE INVENTION

Aspects and advantages of the presently disclosed subject matter will be set forth in part in the following description, or may be apparent from the description, or may be learned through practice of the presently disclosed subject matter.

In view of the recognized features encountered in the prior art and addressed by the presently disclosed subject matter, improved apparatus and methodology are presently disclosed for assembling tower structures, and particularly bases thereof. It should be appreciated that while the present disclosure is directed in exemplary fashion to structural components and assembly methods and apparatus therefor involving precast concrete, various presently disclosed constructions involving any suitable materials may be alternatively practiced in accordance with the presently disclosed subject matter.

In addition, it should be appreciated that while the present disclosure is directed in exemplary fashion to structural components and assembly methods and apparatus therefor for windmills and similar devices, such is not necessarily a specific limitation of the presently disclosed subject matter. For example, it should be clear to those of ordinary skill in the art that a tower constructed in accordance with the present technology may well be used to support, for example, a television transmitter aerial or other radio signal broadcasting aerial. Alternatively, towers constructed in accordance with the present technology may be used to support any type of device that may require placement above local ground level for more effective operation. Such other present uses may include, for example, towers for electrical power transmission lines or athletic field lighting equipment.

It is a general object of the present disclosure to provide an improved tower assembly and method for assembling a tower. It is a more specific object of the present disclosure to provide tower assemblies and methods that provide improved assembly efficiency and structural integrity.

Thus, the present disclosure is directed to tower assemblies and associated or corresponding methodologies. An exemplary assembly and methodology may include a base and a plurality of tubular members stacked on the base. The base may include various components which together provide improved structural integrity to the tower assembly. For example, a base may include a core formed from various core components, as well as various buttresses.

In an exemplary embodiment, generally arcuate core components, which may be formed from pre-cast concrete, may be provided on a previously poured mud (concrete) slab. A foundation layer, typically formed from concrete, may then be provided on the mud slab and between the mud slab and core components. Portions of reinforcement members extending from the core components may become surrounded by the foundation material, and thus embedded in the foundation, advantageously coupling the foundation layer and core components together to provide increased structural integrity to the base and tower assembly in general.

Buttresses may additionally be provided as parts of the base. Various buttresses, which may be termed first buttresses, may include core portions that are disposed between neighboring core components to form the core of the base. These core portions thus connect and become integral with the core components, such that neighboring core components and first buttress core portions form the core. In exemplary embodiments, the first buttresses are formed from concrete which may be preferably cast-in-place. The core portions of such buttresses, when poured and cured, may thus connect neighboring core components. Such arrangement of these core portions of the first buttresses to additionally be integral portions of the core thus advantageously providing stability and further structural integrity to the core, base, and tower assembly.

Additional or alternative buttresses, which may be termed second buttresses, may abut against the core. Such second buttresses, which may be formed from cast-in-place concrete, may additionally provide stability and structural integrity to the core, base, and tower assembly.

In exemplary embodiments, both first and second buttresses may be utilized to form the tower assembly, and may be positioned in alternating fashion about the core.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents including combinations of features, parts, or steps or configurations thereof not expressly shown in the figures or stated in the detailed description of such figures. Additional embodiments of the presently disclosed subject matter, not necessarily expressed in the summarized section, may include and incorporate various combinations of aspects of features, components, or steps referenced in the summarized objects herein, and/or other features, components, or steps as otherwise discussed in this application. Those of ordinary skill in the art will better appreciate the features and aspects of such embodiments, and others, upon review of the remainder of the specification. The accompanying drawings, which are incorporated in and constitute a part of this specification, illustrate embodiments of the presently disclosed subject matter and, together with the description, serve to explain the principles of the presently disclosed subject matter.

BRIEF DESCRIPTION OF THE DRAWINGS

A full and enabling disclosure of the presently disclosed subject matter, including the best mode thereof, directed to one of ordinary skill in the art, is set forth in the specification, which makes reference to the appended figures, in which.

Repeat use of reference characters throughout the present specification and appended drawings is intended to represent same or analogous features, elements, or steps of the present subject matter.

DETAILED DESCRIPTION OF THE PREFERRED EMBODIMENTS

Reference is presently made in detail to exemplary embodiments of the presently disclosed subject matter, one or more examples of which are illustrated in or represented by the drawings. Each example is provided by way of explanation of the presently disclosed subject matter, not limitation of the presently disclosed subject matter. In fact, it will be apparent to those skilled in the art that various modifications and variations can be made in the presently disclosed subject matter without departing from the scope or spirit of the presently disclosed subject matter. For instance, features illustrated or described as part of one embodiment can be used with another embodiment to yield a still further embodiment. Thus, it is intended that the presently disclosed subject matter covers such modifications and variations as come within the scope of the disclosure and equivalents thereof.

Figure 1:
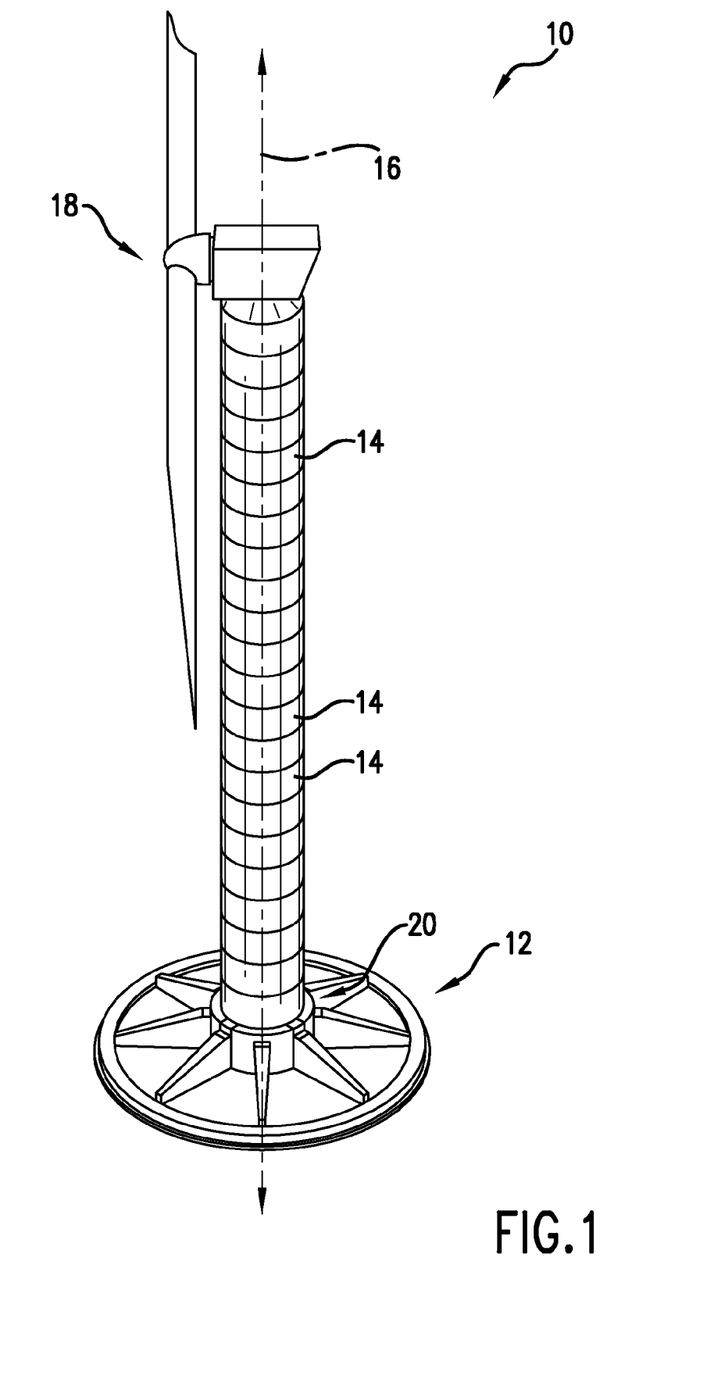
FIG. 1 illustrates a perspective view of a tower assembly in accordance with an exemplary embodiment of the presently disclosed subject matter.

With reference to present FIGS. 1-9, exemplary embodiments of a present tower assembly generally 10 will be described herein. FIG. 1 illustrates an exemplary embodiment of such tower assembly 10. As shown, the tower assembly includes a base 12. A plurality of tubular members 14 may be stacked on the base 12. Such tubular members 14 may in exemplary embodiments be formed from concrete. The tubular member 14 may have any suitable diameters, which may for example be uniform or taper throughout the stack of tubular members 14 or any portion thereof. Each tubular member 14 may generally define a central hole therethrough, which may collectively define a portion of the tower assembly 10 interior. The base 12 and tubular members 14 may generally extend vertically along a longitudinal axis 16 of the tower assembly 10.

It should be understood that the present disclosure is not limited to tubular members 14, and rather that any suitable upper tower members may be provided on the base 12 to form the tower.

FIG. 1 further illustrates a wind turbine assembly 18 provided on the plurality of tubular members 14, although it should be understood that any suitable apparatus for any suitable purpose may be provide on the tubular members 14 or other suitable upper tower members.

Figure 2:
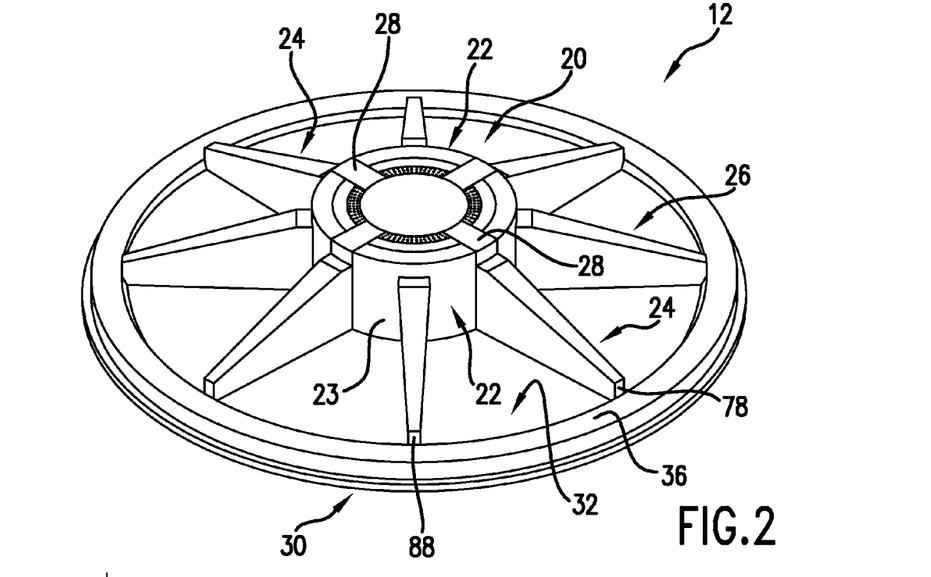
FIG. 2 illustrates a perspective view of a tower base in accordance with an exemplary embodiment of the presently disclosed subject matter.

Referring now to FIG. 2, a base 12 of a tower assembly 10 is illustrated. As shown, base 12 includes a core 20, which includes a plurality of core components 22. Each core component 22 may have a generally arcuate outer sidewall 23, such that the core components 22 collectively generally form a tubular structure. Core 20 and core components 22 may generally be formed from concrete, and may include various reinforcement members, as discussed in detail herein.

As further shown in FIG. 2, a plurality of buttresses may extend from the core 20. The buttresses may include first buttresses 24 and second buttresses 26. As shown and as discussed in detail herein, first buttresses 24 may extend between neighboring core components 22 of the core 20, such that core portions 28 of the first buttresses 22 are disposed between the neighboring core components 22 and further define the tubular structure of the core 20. Second buttresses 26 may abut against core components 22. As further shown, the first and second buttresses 24, 26 may be disposed in alternating fashion around the core 20.

Core 20 and buttresses 24, 26 may be disposed on a mud slab 30 and foundation 32. Mud slab 30 may be an initial foundation layer that is provided on a support surface 34 at a tower assembly location. In exemplary embodiments as shown, the support surface 34 is the ground, which may be a suitable mixture of dirt, clay, etc. Further, in exemplary embodiments, excavation of the support surface 34 may be performed prior to providing the mud slab 30. In some embodiments, such excavation may occur such that the slab 30 is positioned just below the frost line. Accordingly, an excavation depth may in some embodiments be between approximately two feet and approximately three feet in depth. Alternatively, however, any suitable depth is within the scope and spirit of the present disclosure. The slab 30 may then be provided on the support surface 34. In exemplary embodiments, the slab 30 is formed from concrete, and may be poured onto the support surface 34.

Foundation 32 may be a primary foundation layer provided on the mud slab 30 and between the mud slab 30 and core components 22, as discussed herein. Foundation 32 may generally be formed from concrete, and may include various reinforcement members as discussed herein.

It should be understood that, while reinforcement members of various components of the base 12 are discussed herein, the present disclosure is not limited to such described reinforcement members. Rather, any suitable component of the base 12 may include any suitable reinforcement members, such as rebar, etc., therein to suitably reinforce the base 12 and tower assembly 10 in general.

Figure 3:
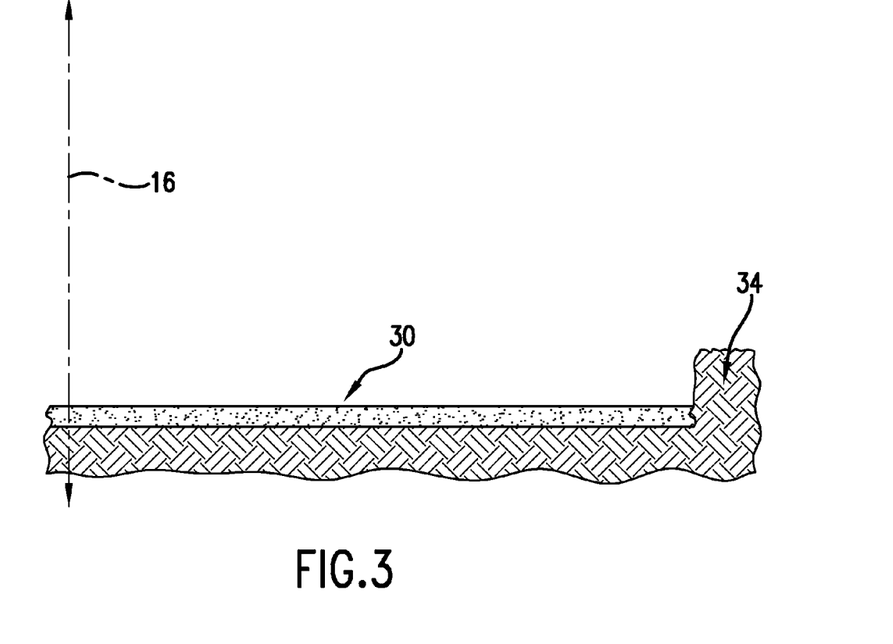
FIG. 3 illustrates a cross-sectional view of the provision of a mud slab on a support surface, such as the ground, in accordance with an exemplary embodiment of the presently disclosed subject matter.

FIG. 3 illustrates a mud slab 30 provided on a support surface 34, as discussed herein. As noted, the mud slab 30 may generally be formed from concrete, and in exemplary embodiments may be poured on the support surface 34. The mud slab 30 may generally provide an initial foundation layer and work surface for construction of the base 12 and tower assembly 10 thereon.

Figure 4:
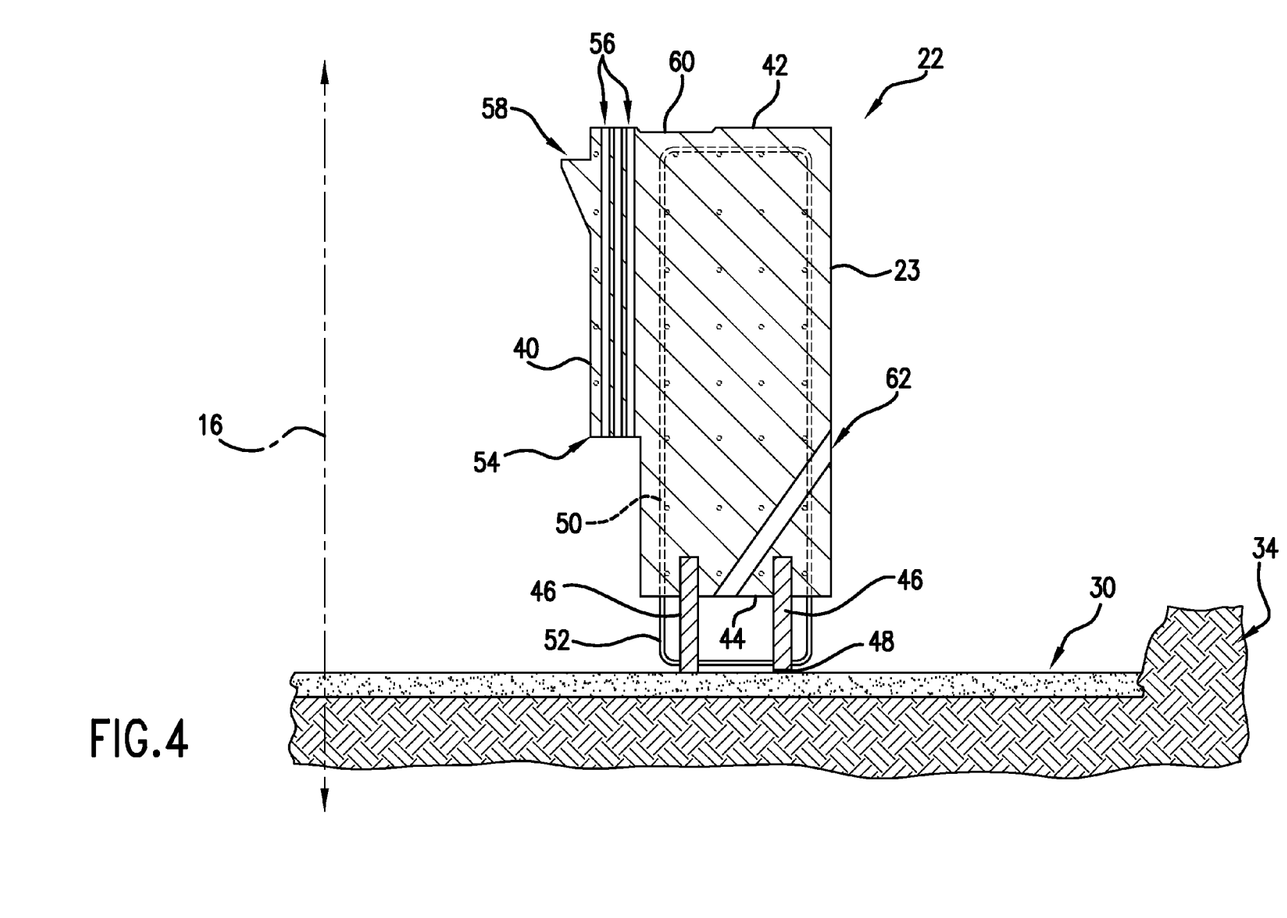
FIG. 4 illustrates a cross-sectional view of the placement of a core component on a mud slab in accordance with an exemplary embodiment of the presently disclosed subject matter.

FIG. 4 illustrates a core component 22 of core 20 provided on a mud slab 30. After the mud slab 30 is provided, each core component 22 may be placed on the mud slab 30. Core components 22 according to the present disclosure are in exemplary embodiments precast concrete components. Each precast component may be placed and positioned on the mud slab 30 to generally form an initial portion of the core 20. As discussed, each core component 22 may generally have an arcuate outer surface 23. Further, a core component may include an inner sidewall 40, which may additionally be generally arcuate, as well as a top wall 42 and a bottom wall 44.

In exemplary embodiments, when a core component 22 is placed on the mud slab 30 as shown in FIG. 4, the bottom wall 44 may be spaced from the surface of the mud slab 30. In such embodiments, core component 22 may further include various members for supporting the core component 22 spaced from the mud slab 30. For example, as shown, core component 22 may further include one or more legs 46. Legs 46 may extend from bottom wall 44 a predetermined distance and, when the core component 22 is placed on the mud slab 30, the legs 46 may support the core component 22 on the mud slab 30. In some embodiments, shims 48 may be provided between one or more legs 46 and the mud slab 30 to level the legs 46 and core component 22 as required. Legs 46 may be formed from a suitable metal or other suitable material.

Additionally, core component 22 may further include one or more reinforcement members 50, which in exemplary embodiments may be rebar. A reinforcement member 50 may generally be embedded in the core component 22, but in some embodiments a portion 52 thereof may protrude from the core component 22, and thus be disposed between the wall 44 and the mud slab 30. For example, as shown, a reinforcement member 50 may include a portion 52 that protrudes from the core component 22 at two separate locations on the wall 44. Such exposed portions 52 of reinforcement members 50 may couple the associated core component 22 with the foundation 32, as discussed herein.

Core component 22 may further include a flange portion 54, which may define one or more bore holes 56 therethrough. The flange portion 54 may extend generally internally into the interior of the tower assembly 10, and may thus include a portion of the inner sidewall 40. Flange portion 54, and the bore holes 56 thereof, may be provided to accommodate post-tensioning tendons therein, as discussed herein.

Core component 22 may additionally include a lip 58, which may extend internally into the interior of the tower assembly 10, and may thus include a portion of the inner sidewall 40. Lip 58 may, for example extend internally from the flange portion 54. The lip 58 may be provided to accommodate thereon a work platform, as discussed herein.

Core component 22 may additionally define a channel 60 on the top wall 42 thereof. Channel 60 may be provided to position therein a tubular member 14 provided on the core component 22. Additionally, channel 60 may accommodate grout or another suitable coupling material utilized between the core component 22 and tubular member 14.

Core component 22 may additionally define an access hole 62 therein. Access hole 62 may provide access through the core component 22 to the concrete utilized to form foundation 32. When the foundation 32 is initially being formed, such as through pouring of the foundation concrete, the hole 62 may be utilized to provide various access to such material, such as for vibrator tools to reduce air bubbles in the material during formation. Hole 62 may further, when the foundation 32 is provided, eventually be filled with foundation 32 material (see FIG. 5 and herein discussion). The hole 62 generally extends through a portion of the core component 22. For example, in exemplary embodiments, a hole 62 may extend from the outer sidewall 23 generally diagonally through the bottom wall 44 of the core component 22.

Figure 5:
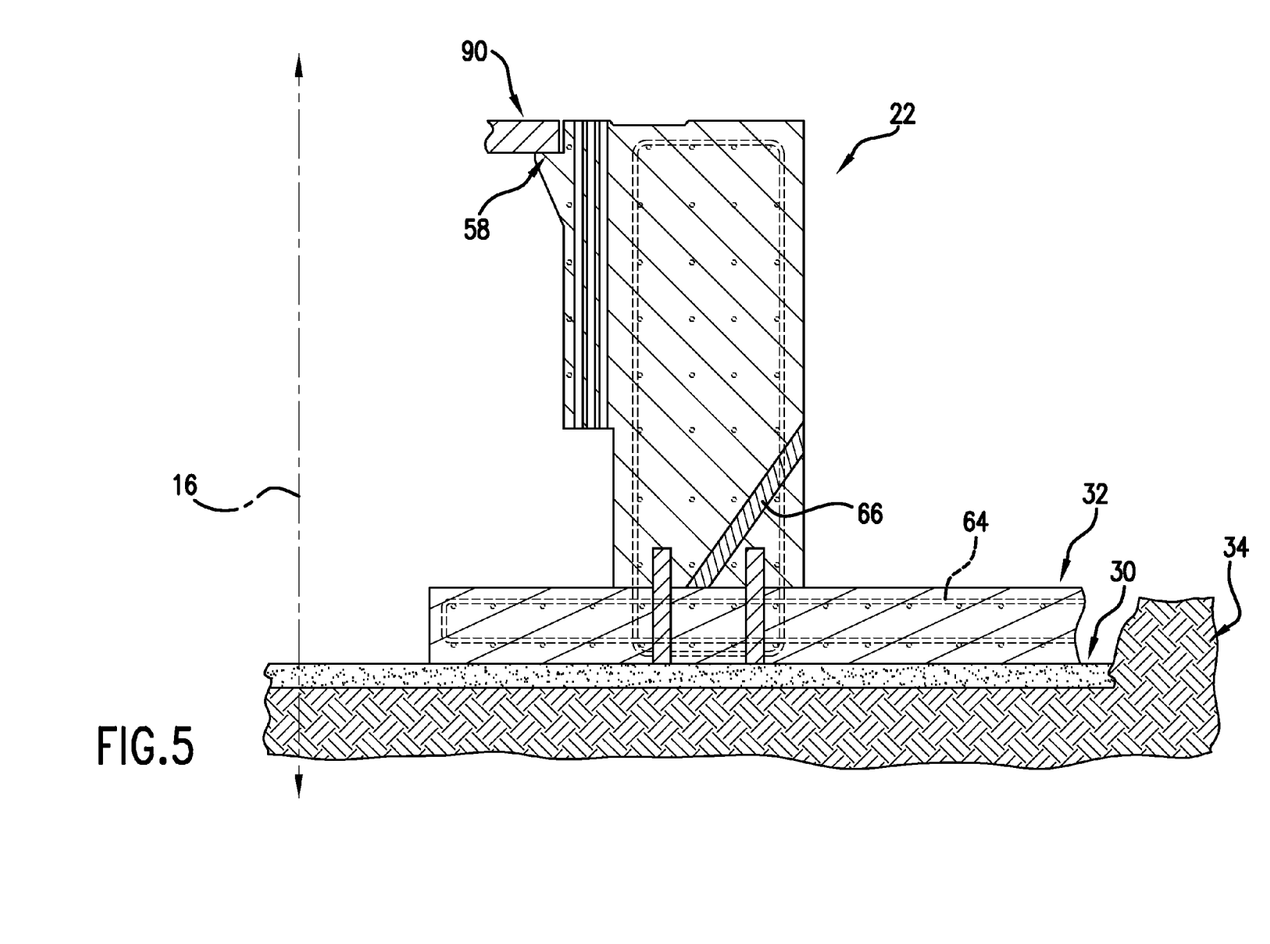
FIG. 5 illustrates a cross-sectional view of the provision of concrete on a mud slab and between the mud slab and a core component to form a foundation, as well the placement of a work platform on the core component, in accordance with an exemplary embodiment of the presently disclosed subject matter.

Referring now to FIG. 5, the foundation 32 is shown. Foundation 32 may, in exemplary embodiments, be formed from concrete which is cast-in-place. Thus, after core components 22 are placed on the mud slab 30, foundation 32 may be poured on the mud slab 30 and between the mud slab 30 and foundation 32. As discussed, core components 22 may include legs 46 and reinforcement member portions 52 extending and protruding therefrom. Such legs 46 and exposed portions 52 may be surrounded by the foundation 32, such that such components become internal components of the foundation 32. Advantageously, the exposed portions 52 of reinforcement members 50 may reinforce the foundation 32, and may additionally couple the foundation 32 and core components 22 together due to the reinforcement members 50 extending within both the foundation 32 and core components 22, thus providing further structural integrity to the tower assembly 10.

It should additionally be noted that foundation 32 may include various additional reinforcement members 64 therein. Such reinforcement members 64 may be placed as desired on the mud slab 30 and between the core components 22 and mud slab 30 before pouring of the foundation 32, and may provide further reinforcement to the foundation 32.

As mentioned herein, during pouring of the foundation 32, various apparatus such as vibrator tools may be utilized to manipulate the foundation 32 through access holes 62 in one or more of the core components 22. Vibrator tools, for example, may be utilized during pouring to reduce air bubbles in the foundation 32. Further, access holes 62 may, in some embodiments, be filled by filler material 66 during or after formation of the foundation 32. For example, once the foundation 32 is formed to an appropriate level, and use of the access holes 32 for manipulation of the foundation 32 has ceased, filler material 66, which may be concrete such as the concrete utilized to form the foundation 32, may be provided in the access holes 62 to fill the access holes 62 and provide additional structural integrity to the core components 22.

Figure 6:
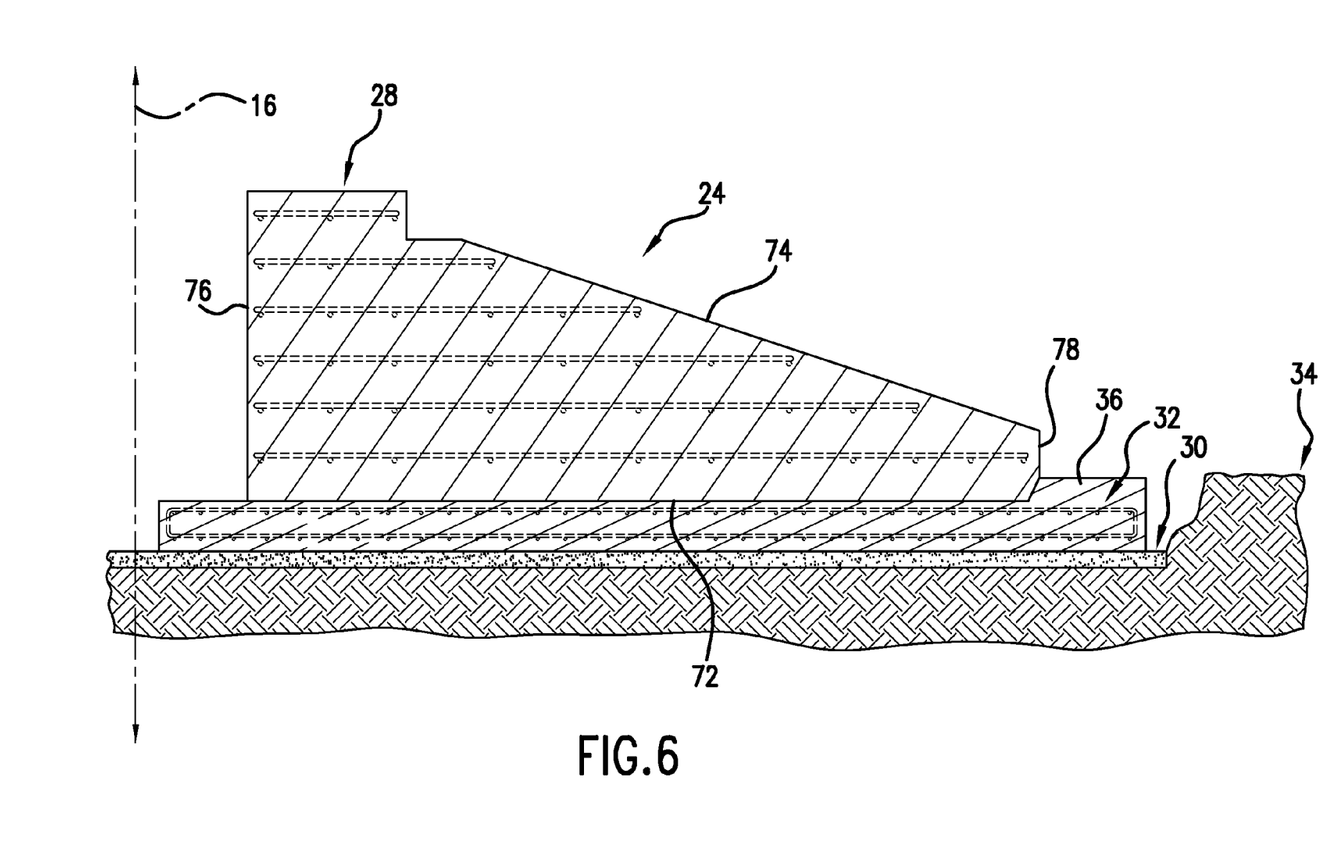
FIG. 6 illustrates a cross-sectional view of the formation of a first buttress, which extends between neighboring core components, in accordance with an exemplary embodiment of the presently disclosed subject matter.
Figure 7:
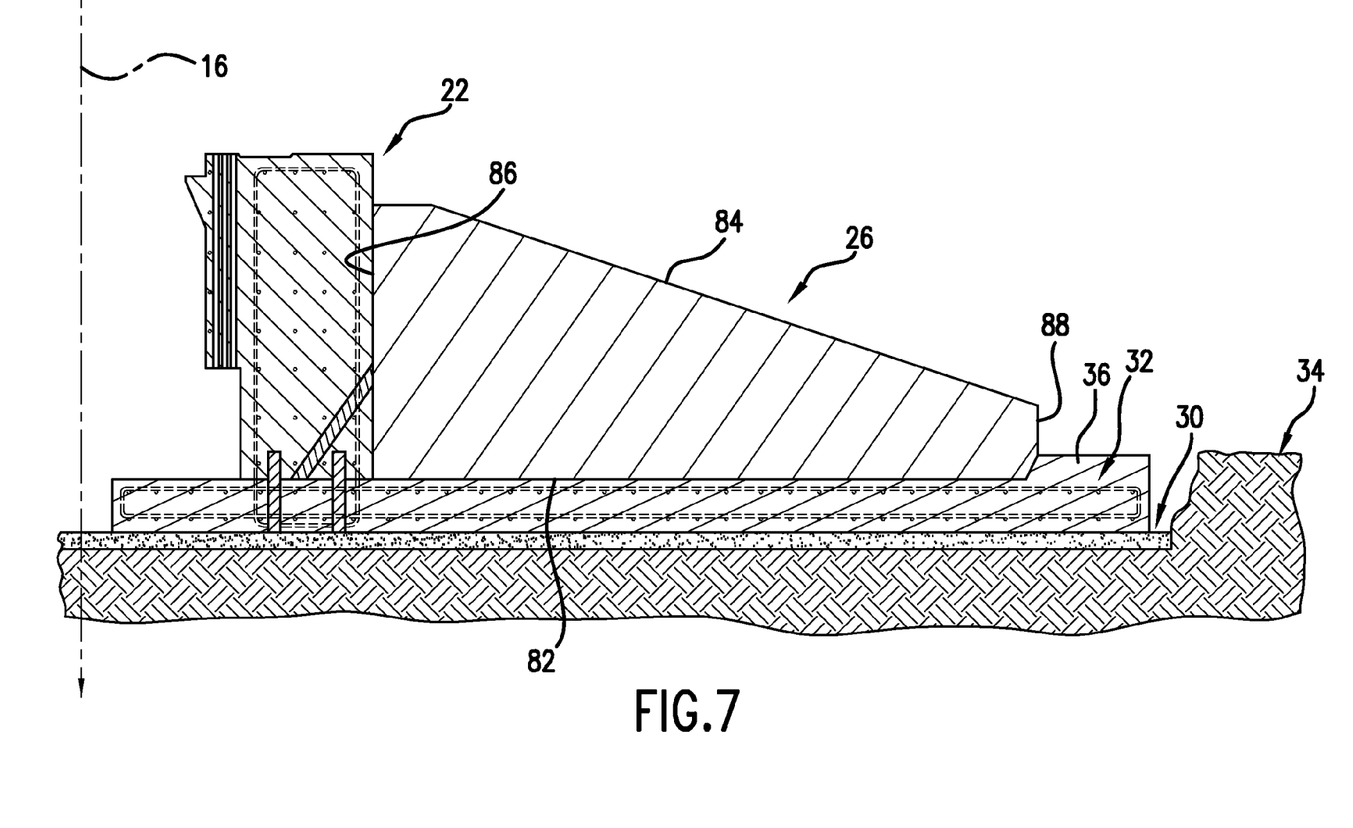
FIG. 7 illustrates a cross-sectional view of the formation of a second buttress, which abuts against a core component, in accordance with an exemplary embodiment of the presently disclosed subject matter.

Referring to FIG. 2 as well as FIGS. 6 and 7, in some embodiments, foundation 32 may additionally include a raised peripheral portion 36. The raised peripheral portion 36 may be an outer portion, such as an outermost ring, of the foundation layer that is raised relatively higher than the remainder of the foundation 32. Such portion 36 may generally provide a boundary for the foundation 32 and base 12 in general. Further, in some embodiments, outer sidewalls 78 of the first buttresses 24 and outer sidewalls 88 of the second buttresses 26 may, when provided on the foundation, abut against the raised peripheral portion 36. Such contact between the buttresses 24, 26 and the raised peripheral portion 36 may stabilize the buttresses 24, 26 and the base 12 and tower assembly 10 in general.

Referring again to FIG. 5, in some embodiments one or more work platforms 90 may be provided on one or more of the core components 22, such as on lip 58. The work platform 90 may be formed from pre-cast concrete, a suitable metal material, or any other suitable material. In general, the work platform 90 provides a platform on which workers erecting the tower assembly 10 can work to assemble various components of the tower assembly 10. The work platform 90 can have any suitable shape and size, but in exemplary embodiments may be generally arcuate or tubular and provided (as a singular component or multiple components) on lips 58 of each core component 22.

Referring now to FIGS. 6 and 7, after the foundation 32 is provided, first and second buttresses 24, 26 may be provided. In exemplary embodiments, buttresses 24, 26 may be formed from concrete which is cast-in-place. Thus, concrete may be poured to form each individual buttress 24, 26 on site at the tower assembly 10 location.

Referring to FIG. 6, a first buttress 24 may include a bottom wall 72 and a top wall 74. The bottom wall 72 may contact foundation 32. The top wall 74, or a portion thereof, may taper generally outwards from the core 20. As discussed herein, a first buttress 24 may further include a core portion 28. Core portion 28 may include a portion of the top and bottom walls 74, 72. Further, core portion 28 may be disposed between neighboring core components 22 to further form core 20. A first buttress 24 and core portion 28 thereof may thus further include a generally arcuate inner sidewall 76 that generally corresponds to the neighboring inner sidewalls 40 of the neighboring core components 22.

As discussed, first buttresses 24 may be cast-in-place, and may thus be formed by pouring concrete on the foundation 32. The core portion 28 may, when poured and cast between neighboring core components 22, couple such neighboring components 22 together to form and provide structural integrity to the core 20 and tower assembly 10 in general. Buttresses 24 may further, in general, stabilize and support the tower assembly 10.

Referring to FIG. 7, a second buttress 26 may include a bottom wall 82 and a top wall 84. The bottom wall 82 may contact foundation 32. The top wall 84, or a portion thereof, may taper generally outwards from the core 20. As discussed herein, a second buttress 26 may abut against a core component 22. A second buttress 26 may thus further include a generally arcuate inner sidewall 86 that generally contacts the outer sidewall 23 of the abutting core component 22.

As discussed, second buttresses 26 may be cast-in-place, and may thus be formed by pouring concrete on the foundation 32. Each buttress 26 may, when poured and cast, abut against and couple with an abutting core component 22. Buttresses 26 may, in general, stabilize and support the tower assembly 10.

As shown in, for example, FIGS. 1 and 2, first and second buttresses 24, 26 may be disposed in an alternating configuration about the core 20. In some exemplary embodiments as shown, four first buttresses 24 and four second buttresses 26 may be utilized, and may alternate about the core 20. Alternatively, any suitable number of first buttresses 24 and/or second buttresses 26 may be utilized. Further, it should be understood that the present disclosure is not limited to the use of alternating first and second buttresses 24, 26, and rather that any suitable arrangement of first buttresses 24 and/or second buttresses 26 is within the scope and spirit of the present disclosure.

Figure 8:
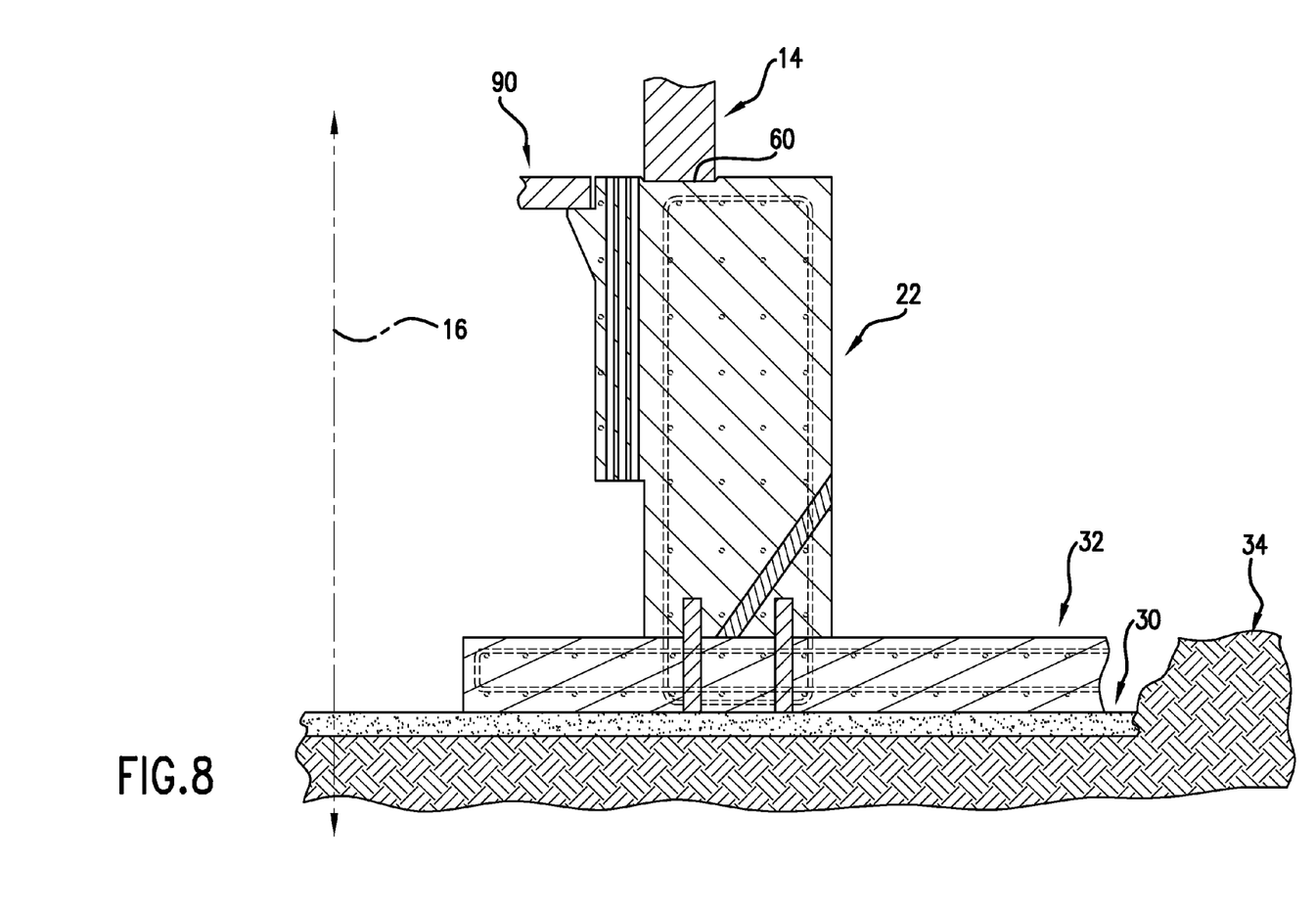
FIG. 8 illustrates a cross-sectional view of the placement of a tubular member on a tower base in accordance with an exemplary embodiment of the presently disclosed subject matter.

Referring now to FIG. 8, tubular members 14 may be stacked on the base 12 after formation thereof. Thus, after the first and second buttresses 24, 26 have been provided, an initial tubular member 14 may be provided on the core platforms 22. In exemplary embodiments, such initial tubular member 14 may be disposed at least partially in channels 60 of the core platforms 22, as shown. It should additionally be noted that each tubular member 14 may be a singular component that is provided on the base 12, or may be formed from multiple segments. For example, a tubular member 14 may be formed as two separate halves, three separate thirds, or other multiple numbers of segments. Separation of the segments may be, for example, along a longitudinal axis of the tubular member 14. Such multiple segments may be assembled together before the tubular member 14 is hoisted and stacked to form the tower assembly 14, or each individual segment may be hoisted and stacked, and the tubular member 14 formed through stacking of each individual segment.

Figure 9:
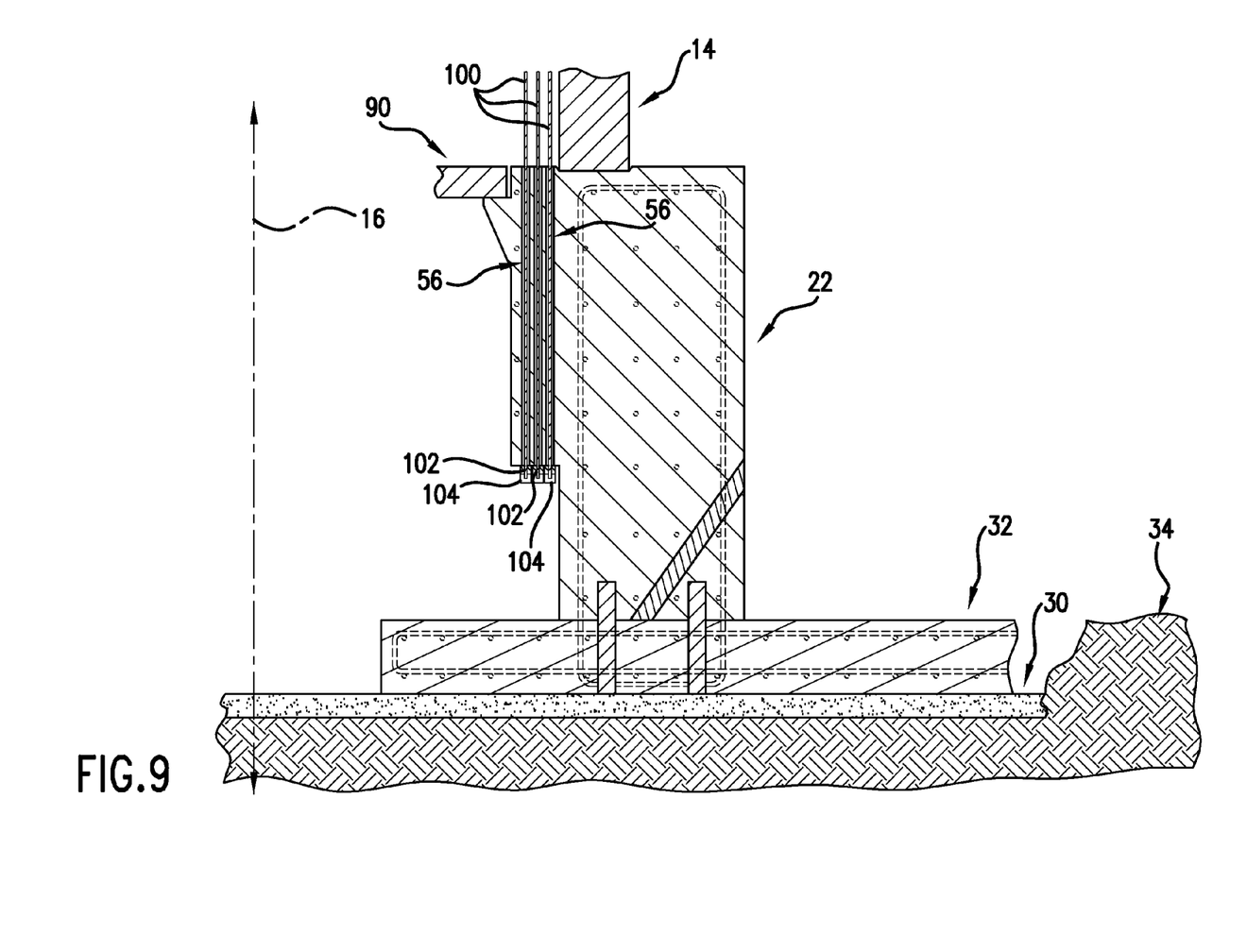
FIG. 9 illustrates a cross-sectional view of the placement of post-tensioning tendons in a core component in accordance with an exemplary embodiment of the presently disclosed subject matter.

Referring now to FIG. 9, after assembly of the tubular members 14 on base 12, one or more post-tensioning tendons 100 may be provided to further reinforce the tower assembly 10 in general. Such post-tensioning tendons 100 may generally extend at an upper end from an uppermost tubular member 14 or other suitable attachment point. Post-tensioning tendons 100 may extend through the interior of the tower assembly 10, and may attach proximate lower ends 102 thereof to core components 22. As shown, for example, tendons 100 may be provided into and through bore holes 56 in the flange portion 54 of one or more core components 22. An anchor component 104 may be applied to the lower end 102 extending from the bore hole 56 to fasten a tendon 100 to the core component 22 and thus apply tension the tendon 100, applying compressive force to the tower assembly 10 to reinforce the tower assembly 10. Any suitable anchor component 104 may be utilized, and may include for example, a washer, chuck, cover, and/or other suitable apparatus.

As discussed, bases 12 according to the present disclosure provide improved structural integrity to tower assemblies 10. Further tower assemblies 10 which utilize bases 12 according to the present disclosure are efficient, reliable, and cost-effective to construct and operate.

The present written description uses examples to disclose the presently disclosed subject matter, including the best mode, and also to enable any person skilled in the art to practice the presently disclosed subject matter, including making and using any devices or systems and performing any incorporated and/or associated methods. While the presently disclosed subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the presently disclosed subject matter as would be readily apparent to one of ordinary skill in the art.

The invention claimed is:

1. A tower assembly comprising:
   a foundation;
   at least one segment of a tower;
   a plurality of core components located on the foundation each and including
      a body having an arcuate outer sidewall and an arcuate inner sidewall, the body including a hole extending from the outer sidewall to a bottom of the body, and the body including at least one reinforcement member located between the outer sidewall and the inner sidewall, the at least one reinforcement member extending into the foundation;
      a flange extending from the arcuate inner sidewall of the body, the flange including at least one bore hole configured to receive a post-tensioning tendon; and
   a plurality of first buttresses each having a first end and a second end, the first end of each first buttress of the plurality of first buttresses being located between an adjacent pair of the plurality of core components.

2. The tower assembly according to claim 1, wherein the at least one reinforcement member is a steel reinforcement bar and the body is made of concrete.

3. The tower assembly according to claim 1, wherein the flange further includes a lip configured to support a work platform.

4. The tower assembly according to claim 1, wherein the bore hole extends in a direction parallel to a surface of the inner sidewall.

5. The tower assembly according to claim 1, wherein the body includes 3 bore holes, each bore hole being configured to receive a corresponding post-tensioning tendon.

6. The tower assembly according to claim 1, wherein the top surface of the body includes a channel configured to receive a portion of the tower assembly.

7. The tower assembly according to claim 1, further comprising:
   a plurality of second buttresses each having a first end and a second end, the first end of each second buttress of the plurality of second buttresses being located adjacent to an outer sidewall of one of the plurality of core components.

8. The tower assembly according to claim 7, wherein the foundation includes a raised portion around a perimeter of the foundation.

9. The tower assembly according to claim 8, wherein each of the plurality of first buttresses extends such that the second end of each of the plurality of first buttresses is adjacent to the raised portion of the foundation.

10. The tower assembly according to claim 8, wherein each of the plurality of second buttresses extends such that the second end of each of the plurality of second buttresses is adjacent to the raised portion of the foundation.

11. The tower assembly according to claim 7, wherein a number of the plurality of first buttresses is equal to a number of the plurality of second buttresses.

12. The tower assembly according to claim 11, wherein the plurality of first buttresses and the plurality of second buttresses are arranged alternately around the core components.

13. The tower assembly according to claim 1, further comprising:
   a work surface supported by a lip located on each flange on the plurality of core components.

14. The tower assembly according to claim 1, wherein the at least one segment of the tower is located in a channel in a top surface of each core component.

* * * * *